United States Patent [19]

Corral

[11] Patent Number: 5,577,585
[45] Date of Patent: Nov. 26, 1996

[54] DECLUTCHING MECHANISM WITH AN HYDRAULIC ACTUATOR, ESPECIALLY FOR WORKING IN TRACTION ON THE CONNECTING PIECE OF A CLUTCH

[75] Inventor: Cecilio M. Corral, Madrid, Spain

[73] Assignee: Valeo, Paris, France

[21] Appl. No.: 284,488

[22] PCT Filed: Dec. 9, 1993

[86] PCT No.: PCT/FR93/01220

§ 371 Date: Sep. 16, 1994

§ 102(e) Date: Sep. 16, 1994

[87] PCT Pub. No.: WO94/13972

PCT Pub. Date: Jun. 23, 1994

[30] Foreign Application Priority Data

Dec. 9, 1992 [FR] France .................................. 92 14855

[51] Int. Cl.⁶ .................................................. F16D 25/08
[52] U.S. Cl. ...................... 192/91 A; 192/98; 192/110 B; 192/85 CA
[58] Field of Search ...................... 192/91 A, 98, 192/85 CA, 110 B, 70.13

[56] References Cited

U.S. PATENT DOCUMENTS 4,684,003  8/1987  Leigh-Monstevens ............. 192/85 CA 5,014,841  5/1991  Gillespie .............................. 192/105 C

FOREIGN PATENT DOCUMENTS

| 0383576 | 8/1990 | European Pat. Off. . | |
| 2701079 | 8/1994 | France | 192/91 A |
| 2701077 | 8/1994 | France | 192/91 A |
| 9100927.8 | 4/1991 | Germany . | |
| 4236377 | 5/1993 | Germany | 192/91 A |
| 2098697 | 11/1982 | United Kingdom | 192/91 A |

Primary Examiner—Andrea L. Pitts
Attorney, Agent, or Firm—Longacre & White

[57] ABSTRACT

A declutching mechanism having firstly, a hydraulic actuator comprising at least one fixed member and a movable member defining a first control chamber, and secondly, a clutch release bearing attached to the movable member and manoeuvrable by the latter in a first axial direction, referred to as the declutching direction, in order to transmit a declutching force to a connecting piece. The actuator includes a second control chamber which is independent of the first control chamber, and which is delimited at least partly by the fixed member and the movable member for the manoeuvre of the movable member in the opposite direction.

15 Claims, 6 Drawing Sheets

DECLUTCHING MECHANISM WITH AN HYDRAULIC ACTUATOR, ESPECIALLY FOR WORKING IN TRACTION ON THE CONNECTING PIECE OF A CLUTCH

BACKGROUND OF THE INVENTION

1. Field of the Invention

The present invention is concerned in general terms with a declutching mechanism having a clutch release bearing, for working in traction on the connecting piece of a clutch.

2. Description of the Prior Art

Such a mechanism is described in the document FR-A-2 304 826. In this document the connecting piece, constituting a declutching ring, is part of a primary block which includes the engine and its clutch.

The piece is suitably carried on the declutching means of the clutch, typically the fingers of a diaphragm. The clutch release bearing is part of a secondary block which comprises the gearbox with its input shaft. The release bearing is mounted for axial movement along a guide tube, under the action of a declutching fork which is mounted pivotally on a casing hood fixed to the gearbox.

Tractive coupling means, having a radially elastic coupling member, are arranged between the connecting piece and an actuating member which is part of a clutch release bearing.

Thus, during the assembly operation, it is necessary to bring the primary and secondary blocks axially towards each other in order to proceed with fitting them together by snap-fitting or clipping. In this connection, bosses are arranged on the release bearing so that the fork can also drive the release bearing in the opposite direction to the normal declutching direction.

Thus, by uncoupling the fork from the control linkage, it is possible, due to the coupling member, to cause the fork to deflect in the opposite direction for the purposes of carrying out the blind snap-fitting of the clutch release bearing with the connecting piece.

These arrangements cannot be used when the clutch release bearing is attached to a hydraulic actuator. For example, as described in the document FR-A-2 651 846, the declutching mechanism, for working in traction on the connecting piece of a clutch, in particular for a motor vehicle, includes firstly, a hydraulic actuator comprising at least one fixed member and a movable member in piston and cylinder relationship so as to define a first control chamber, and secondly, a clutch release bearing attached to the movable member and manoeuvrable by the latter in a first axial direction referred to as a declutching direction, for transmitting a tractive declutching force to the connecting piece.

In that document, in order to permit snap-fitting assembly, an abutment is provided which prevents the clutch release bearing from moving during the fitting operation.

This abutment is part of a rod having a V-shaped groove at its end.

The rod is fixed to a piston, which is displaceable within a cylinder defined by a protuberance of the fixed part of the actuator. This rod is acted on by a spring. During the fitting operation, the clutch release bearing is first retracted manually, and the piston is then displaced manually to cause the abutment to emerge. Afterwards, the spring maintains the release bearing in position.

After the clutch mechanism has been fitted to the connecting piece, a pressure is applied from a master cylinder through a duct in order to retract the rod and the abutment.

All of these arrangements are complicated, take a long time to carry out, and are not compatible with blind fitting. They lead to an increase in they size of the fixed member of the actuator.

OBJECT OF THE INVENTION

An object of the present invention is to overcome these drawbacks, and accordingly to provide a novel and inexpensive arrangement which enables easy, rapid, blind snap-fitting of the clutch mechanism having a hydraulic actuator, to its associated connecting piece.

SUMMARY OF THE INVENTION

According to the invention, a clutch mechanism of the type described above is characterized in that the hydraulic actuator comprises a second control chamber, which is independent of the first control chamber and delimited at least partly by the fixed member and the movable member, to manoeuvre the movable member and the clutch release bearing axially in the direction opposite to the declutching direction.

Thanks to the invention, snap-fitting assembly is blindly carried out. In this connection, during the snap-fitting operation it is sufficient to pressurize the second control chamber in such a way that the clutch release bearing projects axially with respect to the fixed member.

This pressurization is carried out rapidly, in such a way that assembly times are reduced. In addition, the fixed and movable members remain simple, and use is made of the movable member which is displaced in the opposite direction for snap-fitting the volume of the first chamber then being minimized.

After snap-fitting, the pressure is released in the second control chamber. This second chamber being independent of the first chamber, it is possible to pressurize it with a fluid separate from the fluid with which the first control chamber is pressurize.

It is also possible, after having depressurized the first chamber, to pressurize the second chamber so as to release the coupling member and facilitate the removal of the declutching mechanism.

Thus, by virtue of the second chamber, permanent benefit is obtained from a potential abutment which can easily be made operational by pressurizing the second chamber.

According to an important feature of the invention, the second control chamber is pressurized pneumatically for the purposes of fitting the declutching mechanism on its connecting piece.

Thus it is possible to easily and rapidly to pressurize the second chamber on the production line, for example with the aid of a compressed air gun, so as to achieve blind fitting.

After snap-fitting has taken place, the gun is withdrawn and the second control chamber readily evacuates itself naturally and quickly.

In a modification, the second control chamber may be pressurized pneumatically in advance, and closed by means of a stop valve which is opened after snapfitting has been carried out.

It will be appreciated that this second chamber, pressurized pneumatically for example with compressed air, constitutes a resilient abutment, and that the pressure which prevails in this second chamber is not too high, so that during the fitting together of the declutching mechanism with the connecting pieces there is no risk of damaging the components, while the air does not penetrate into the first control chamber.

Otherwise when the second chamber is pressurized with an incompressible fluid, it will give rise to evacuation problems.

A resilient abutment is thus created which is retractable rapidly by depressurization of the second chamber.

In all cases, the first control chamber is not pressurized. In a modification, the first chamber may be filled beforehand, with its fluid being evacuated during fitting or removal.

It will be appreciated that it is possible to continue to use standard connecting pieces, such as those which are for example described in the document FR-A-2 653 195 to which patent U.S. Pat. No. 5,113,989 corresponds.

In that case, the fingers of the coupling clip can be unhooked so as to open before fitting, so that the snap-fitting forces are reduced.

After assembly, the coupling clip is reclosed by hooking its fingers together.

It is even possible to elongate the usual engagement aperture of the clutch release bearing for cooperation with its associated coupling clip.

Preferably, the feed orifice for the second chamber is arranged in the vicinity of the zone in which the fixed part is fastened to the gearbox, which simplifies the manufacture of the components.

In one embodiment, the movable member (the piston) is mounted within a cavity which is delimited by the fixed member and by a guide tube which serves for fastening the fixed member.

The piston then preferably has one end having a transverse flange, which is directed away from the axis of the assembly. This flange thus naturally delimits its two chambers.

In a modification, the second control chamber is defined on an abutment sleeve, with which the declutching mechanism is provided for engagement by a return spring. In all cases, use is made of existing components to define an orifice in a simple way.

It will be appreciated that pressurization of the second chamber compresses the return spring, which enables the coupling member to be disconnected and facilitates the removal of the declutching means.

In addition, the declutching mechanism may be provided with a protective bellows which is accessible from outside, and which runs no danger of being torn during the snap-fitting operation.

DETAILED DESCRIPTION OF THE INVENTION

Figure 1:
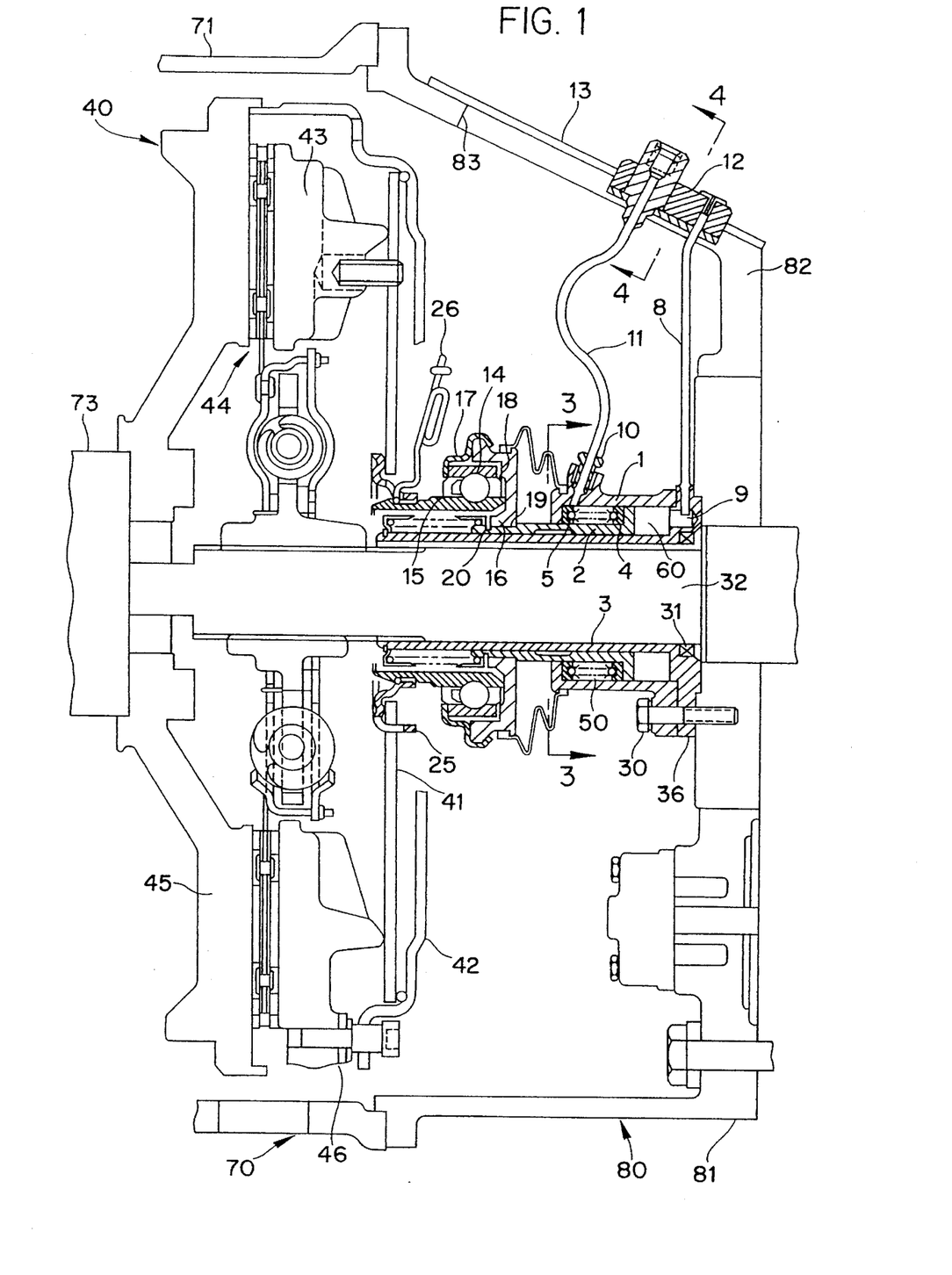
FIG. 1 is a view in axial cross section, with the primary and secondary blocks being shown partially, together with the declutching mechanism in accordance with the invention after it has been assembled to its associated connecting piece.

These Figures relate to the assembly, by snapfitting, of a declutching mechanism having a clutch release bearing 15 (FIG. 1), 150 (FIG. 8), on a connecting piece 25 of a clutch 40, of the pull-off type, for a motor vehicle having an internal combustion engine.

The connecting piece 25 is part of a primary block 70 (FIG. 1) comprising the internal combustion engine with its casing 71, while the declutching mechanism is part of a secondary block 80, which includes the gearbox 82 with its hood piece 81 which is adapted to be fixed to the casing 71.

Tractive fastening means are arranged between the connecting piece 25 and the declutching mechanism, for the mounting of the declutching mechanism, by snapfitting, on its connecting piece 25 which is carried on the declutching means of the clutch 40. In this example this declutching means consists of a diaphragm 41.

It will be recalled that the clutch 40, apart from the diaphragm 41, comprises a cover plate 42, a pressure plate 43 coupled in rotation to the cover plate 42 while being mounted for axial movement with respect to the latter, in this example by means of tangential tongues 46, a friction disc 44, and a reaction plate 45.

The group of components 41, 42, 43, which are annular in shape, Constitutes a mechanical clutch which is carried, through its cover plate 42 by means of screws not shown, on the reaction plate 45 which is coupled in rotation to the crankshaft 73 of the internal combustion engine.

The disc 44 has, at its outer periphery, friction liners which are arranged to be gripped axially between the plates 43 and 45, and, at its inner periphery, a hub which is internally splined so as to be coupled in rotation with the input shaft 32 of the gearbox.

In the position in which the clutch is engaged, the diaphragm 41 bears, through the outer portion of its Belleville ring, on an engagement surface carried by the cover plate 42, and through the inner portion of its Belleville ring, on a divided boss of the pressure plate 43 so as to urge the plate 43 towards the reaction plate 45 and to grip the friction liners of the disc 44 between the said plates.

The torque is thus transmitted from the crankshaft 73 to the input shaft 32.

In order to disengage the clutch, it is necessary to work in traction on the ends of the fingers of the diaphragm, extending radially inwardly from the inner periphery of the Belleville ring, so as to cause the latter to deflect and to cause the gripping action exerted on the plate 43 to cease, whereby to release the liners of the disc 44.

The manoeuvre is carried out with the aid of a clutch release bearing assembly which includes the connecting piece 25, the declutching mechanism, and tractive coupling means arranged between the connecting piece 25 and an actuating element 47 (FIG. 2), 147 (FIG. 8), which is part of the clutch release bearing.

These means are adapted to effect axial coupling between the components 25, 47, going from the declutching device 41 to the clutch release bearing 15, 150.

They include, firstly, a coupling member 26 which is resiliently deformable in the radial direction, and which is at least partially engaged in an expansion aperture that is formed in one of the components comprising the connecting piece and actuating element, and which projects in the free state radially with respect to the component. Secondly, a drive surface which is formed in a recess 48, 148 formed on the other one of the components comprising the actuating element and connecting piece and with which the coupling member cooperates axially in engagement in the axial direction concerned.

All of the arrangements described in the documents FR-A-2 304 826 and FR-A-2 651 846 may be envisaged, but here, the coupling member is an elastic clip of the same type as that described in the document FR-A-2 653 195 (U.S. Pat. No. 5,113,989), to which reference is made.

The connecting piece 25 is similar to that in FIG. 3 of U.S. Pat. No. 5,113,989. It thus includes a profiled collar which is adapted for its engagement on the ends of the fingers of the diaphragm 41 integrally with the collar, a sleeve portion which is arranged to pass axially through the diaphragm, via the central aperture in the latter into which the fingers of the diaphragm project.

The coupling clip 26, which is open in the free state, extends annularly into the interior of the sleeve portion. It is elastically deformable in a radial direction and is adapted for attachment of the clutch release bearing 15, 150 by simple snap-fitting of the latter, at least in the axial sense considered from the collar to the clip, the sleeve portion having two distinct openings, each for the passage of a finger of the clip 26, these being separated from each other by a bridge. These fingers are directed towards the outside of the sleeve portion, being hooked one on to the other (FIG. 5).

Each of the fingers is formed with a deformation in the form of a loop which elastically increases their length.

The clip also has two lugs (FIGS. 5, 6) in the form of ears, each of which is engaged in an aperture in the sleeve portion.

Figures 4, 5, 6:
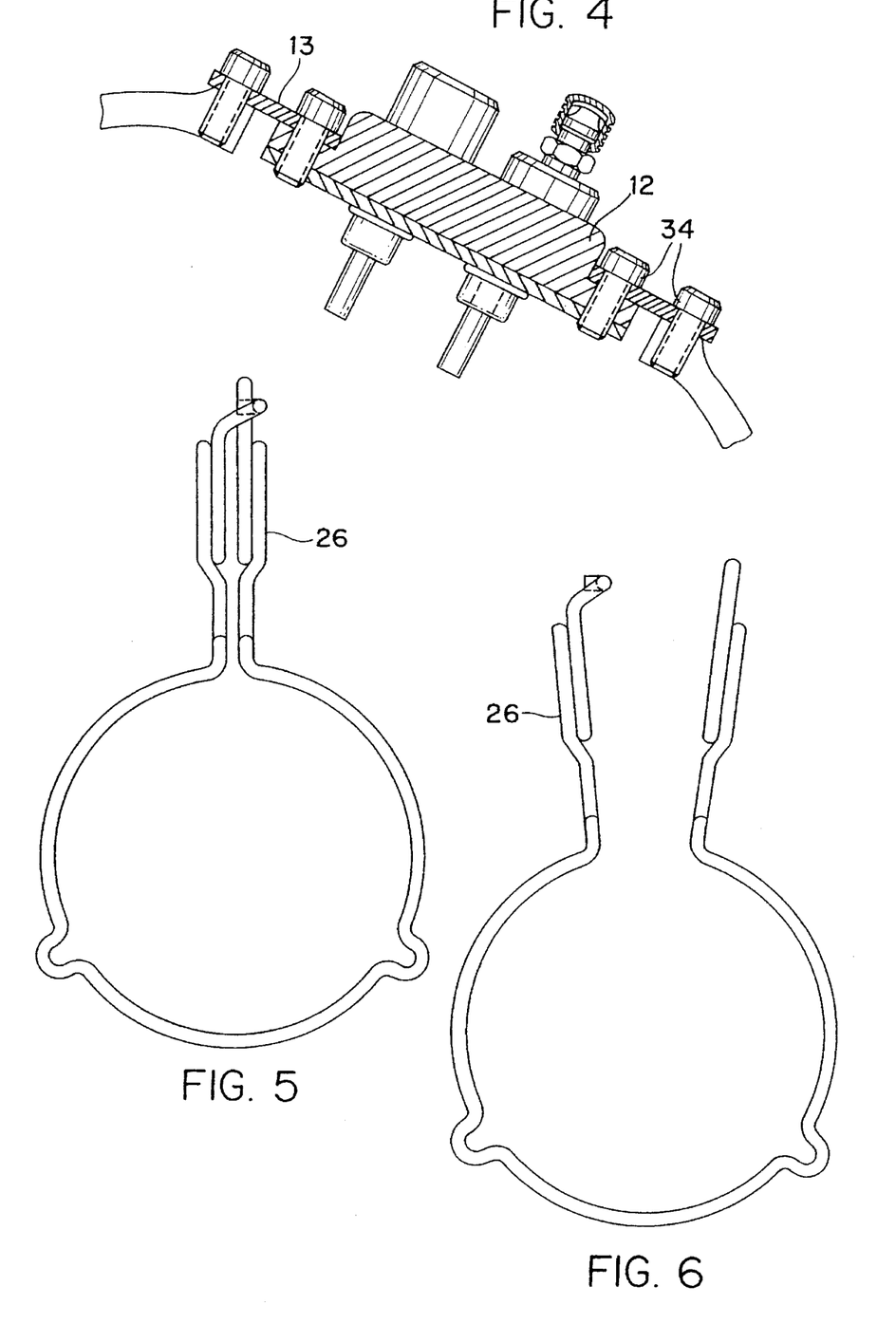
FIG. 4 is a view in cross section taken on the line 4—4 in FIG. 2.
FIGS. 5 and 6 are views in elevation showing the coupling clip in the closed and open positions respectively.
Figure 7:
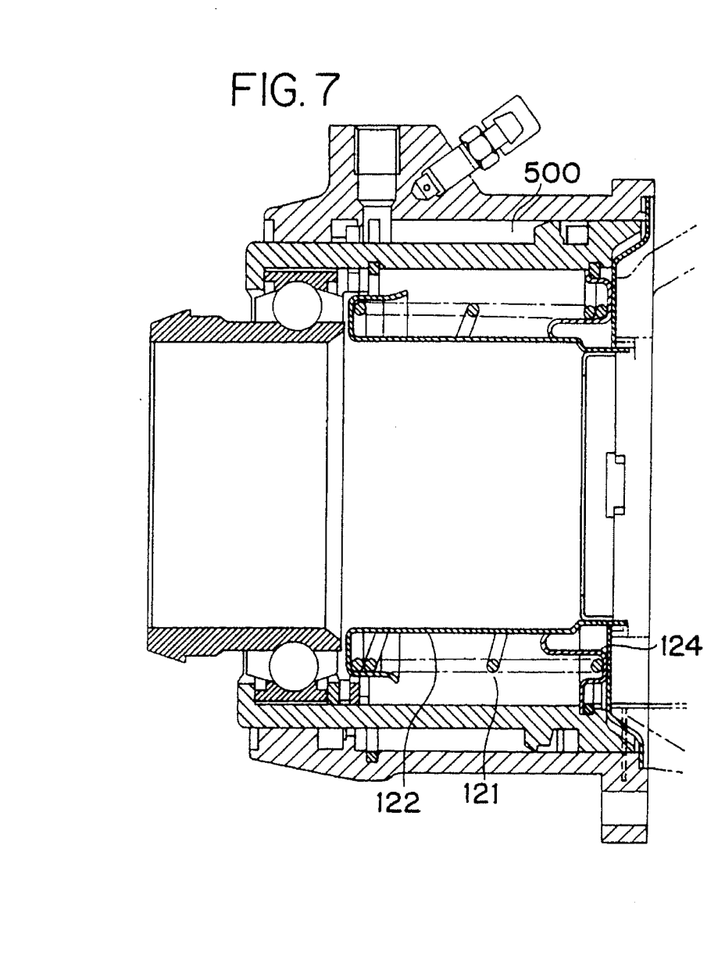
FIG. 7 is a view in axial cross section of a declutching mechanism in the clutch-engaged position, and not equipped with the second control chamber in accordance with the invention.

It is thus possible to perform an unclipping operation by unhooking the fingers (FIG. 6).

The connecting piece 25 is carried on the ends of the fingers of the diaphragm, by means of retaining fingers which are carried in cantilevered relationship by lugs which pass through the fingers of the diaphragm, via openings which are arranged between the fingers of the diaphragm.

These retaining fingers extend parallel to the collar in order to ensure, in cooperation with the collar of the piece 25, the retention of the connecting piece 25 on the diaphragm 41.

In this example, the declutching mechanism includes, firstly, a hydraulic actuator 1, 2, 3-100, 200 comprising at least one fixed member 1, 100 and a member 2, 200 which is movable in piston and cylinder relationship with it, so as to define a first control chamber 50, 500. Secondly, the clutch release bearing 15, 150, which is attached to the movable member 2, 200 and manoeuvrable by the latter in a first axial direction, referred to as the declutching direction, so as to transmit a tractive declutching force to the connecting piece 25.

For assembling of this declutching mechanism together with the connecting piece, it is necessary to bring the engine towards the gearbox so that the shaft 32 penetrates into the internal bore of the hub of the disc 44, and so that the connecting piece 25 snaps into engagement with the clutch release bearing 15, 150 by virtue of the coupling member, the engagement and expansion apertures, and the drive surface.

To this end, in accordance with the invention, the hydraulic actuator 1, 2, 3-100, 200 includes a second control chamber 60, 600 which is independent of the first control chamber 50, 500, and which is delimited at least partly by the fixed member 1, 100 and the movable member 2, 200, for the manoeuvre of the movable member and the clutch release bearing axially in a direction opposite to the declutching direction.

In accordance with one feature, the second chamber 60, 600 is pressurized pneumatically for the fitting (or assembly) of the declutching means on to the connecting piece. After this fitting has taken place, the second chamber is depressurized.

Figure 2A:
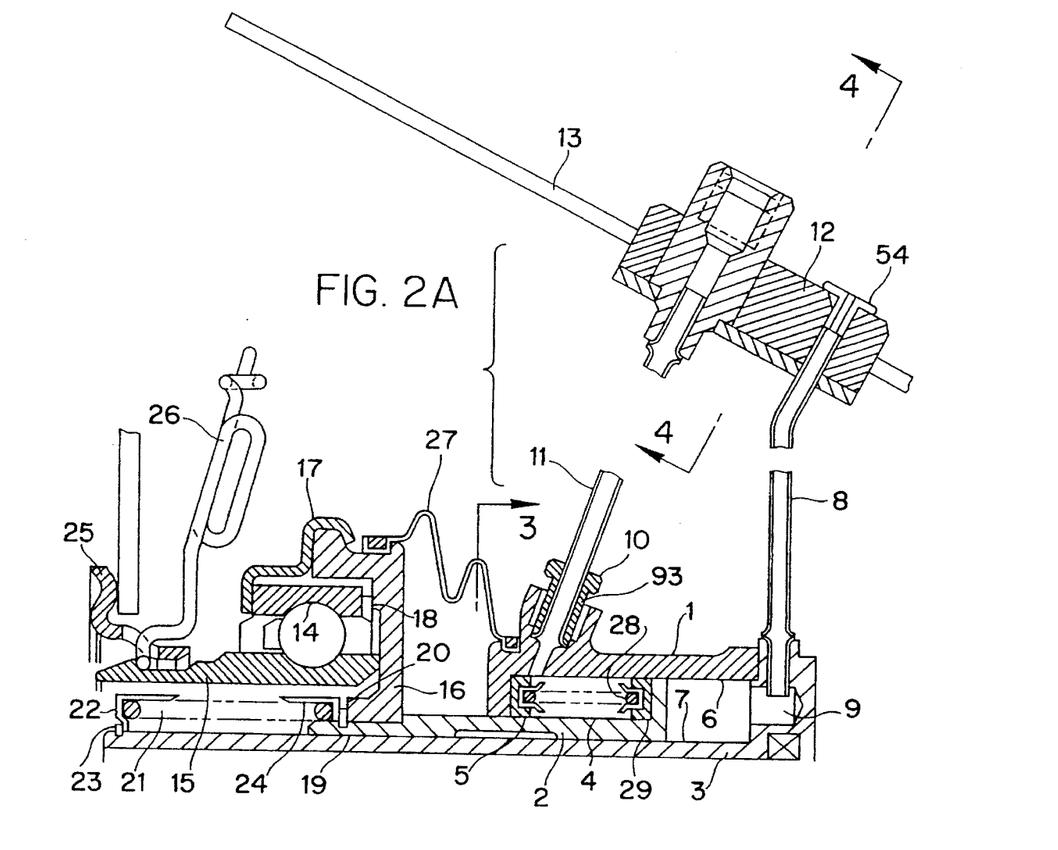
FIG. 2 is an enlarged view of FIG. 1, showing the declutching mechanism in accordance with the invention on a larger scale.
Figure 2B:
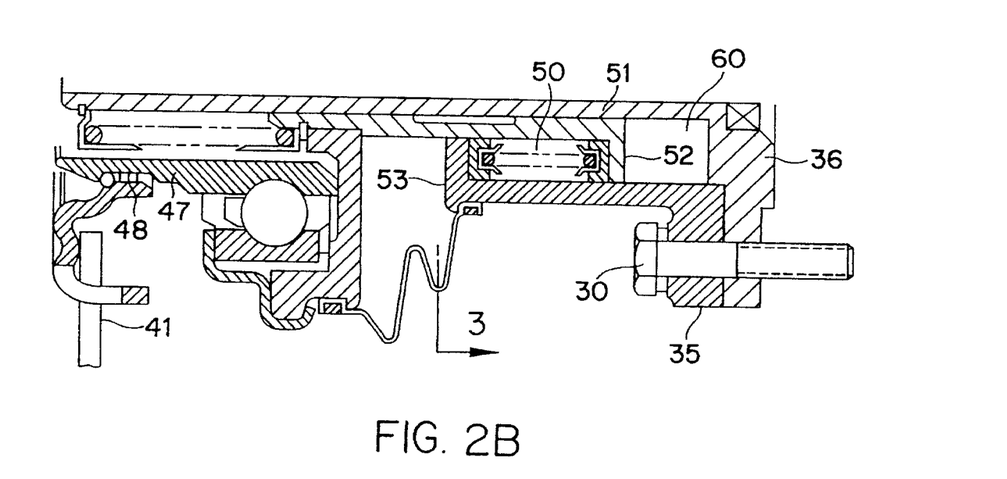
Figure 8:
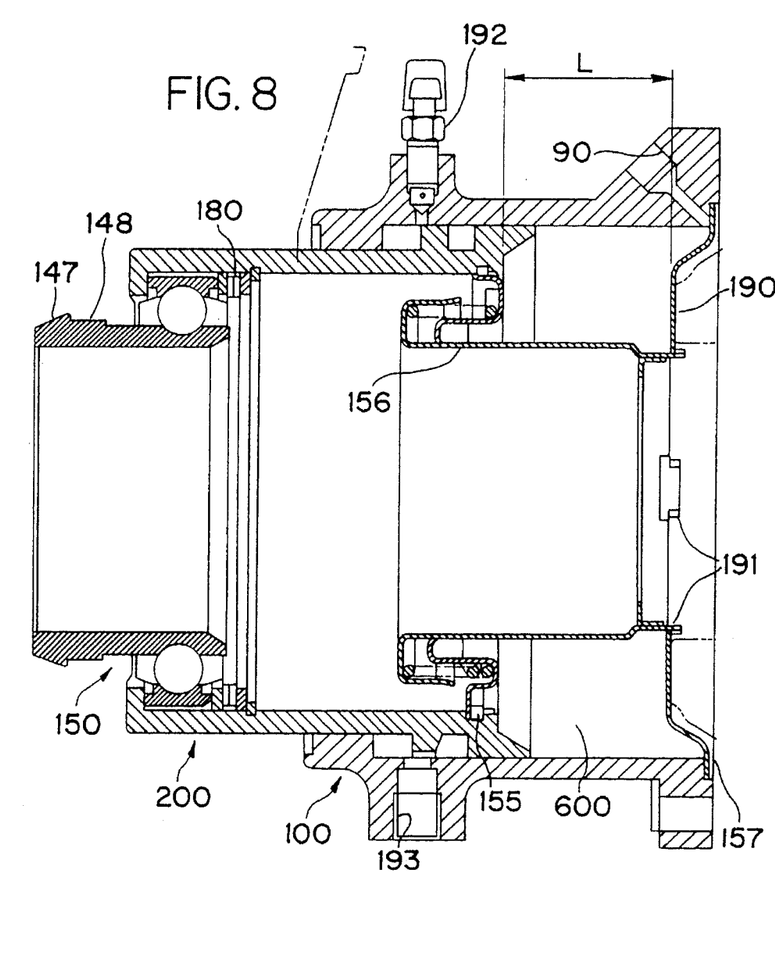
FIG. 8 is a view in cross section similar to FIG. 7 showing the declutching mechanism, in a second embodiment of the invention, in an extended position before it has been snap-fitted to the connecting piece.

In FIGS. 2 and 8, the supply orifice 9, 90 of the second chamber 60, 600 is arranged at the level of the zone in which the fixed part 1 is fastened to the gearbox 82 which constitutes a fixed member.

In FIGS. 1 to 4, the clutch release bearing 15 includes a ball bearing 14, the inner ring of which is rotatable and defines an actuating element 47 having an engagement recess 48, one end of which defines the drive surface for the clip 26.

The fixed outer ring of this bearing 14 is acted on by a resilient ring 18, which in this example is a corrugated ring, and which bears on a radial plate 16 and on one of the sides of the outer ring of the bearing 14, so as to bias the other side of this ring into contact with a dished retaining ring 17, which is attached on the radial plate 16 by a rolling process and which for this purpose has at its periphery a notched, axially oriented annular flange.

The bearing 14 is mounted with a radial clearance with respect to the dished retaining ring 17 and to the said annular flange, in such a way that the release bearing is of the automatic centering type in which its automatic centering is maintained.

The radial plate 16 is mounted on the front end portion 19, having a reduced diameter, of the piston 2, and is located axially between the shoulder defined by the change in diameter of the piston 2 and a restraining circlip 20 which is fitted in a groove of the end portion 19.

The piston 2 constitutes the movable member in accordance with the invention. It consists of a sleeve, the rear end portion (opposite to the end portion 19) of which has a transverse flange 52 which is directed away from the axis of the assembly.

The piston 2 slides axially along the guide tube 3.

This flange penetrates into a cavity which is delimited by a guide tube 3 and an annular member 1 in the form of a sleeve, which constitute the fixed part in accordance with the invention.

The members 1 and 3 constitute a cylinder for the piston 2.

For this purpose, the member 1 has at its front end (i.e. that which is closest to the radial plate 16) a transverse flange 53 which is directed towards the axis of the assembly, and through the center of which the piston 2 passes sealingly, while the guide tube 1 has at its rear end a transverse flange 36 described below.

The guide tube 3 serves as a support and centering means for the whole assembly, especially the piston 2, by preventing reaction forces and destructive loads from reaching the sliding diameter of the sealing rings 4 and 5, which here are preferably double acting. These rings 4 and 5 provide sealing for the chamber 50, which is delimited by the concentric members 1, 2 and their flanges 52, 53.

A return spring 28 is interposed between the rings 4 and 5, engaging for this purpose on thrust insert cups 29 which are interposed between each end of the coil spring and the sealing rings 4 and 5 respectively.

The member 3 has at its end which is adjacent to the gearbox 82 a transverse securing flange 36 which is directed away from the axis of the assembly. This flange is shouldered for the purpose of centering the member 1, which has fastening ears 35.

Fastening members 30, which in this example are studs, but which in a modification may be rivets or bolts, pass through the gears 35, and also pass through the flange 36 so as to secure the fixed assembly (the cylinder) 1, 3 to the fixed member of the vehicle, which in this example is the casing of the gearbox 82.

In this example, according to one feature, the second control chamber 60 is delimited by the member 1 and the tube 3, and it is closed by the flange 36 and the end flange 52 of the piston 2.

This flange 52 delimits in a simple manner two chambers 50, 60 within the cavity defined by the members 1 and 3.

Thus, the second chamber 60 is delimited by the inner periphery 6 of the member 1, by the outer periphery 7 of the member 3, and by the flanges 52, 36.

A sealing bellows 27 with notched ends extends between the member 1 and the radial plate 16, so as to prevent any dirt or other pollutant from contaminating the piston 2 at the level of the flange 53 of the member 1, to the detriment of its sliding movement.

A preloading spring 21 is also provided, for the purpose of ensuring permanent contact of the connecting piece 25 with the diaphragm 41, and also to ensure that the clip 26 is at all times gripped between the sleeve portion of the connecting piece 25 and the engagement surface defined in the recess 48 of the actuating element 47 of the release bearing 15.

This spring 21, which is fitted inside the actuating element 47, acts between two thrust elements, each of which is part of a support and guide member 22, 24. These members 22 and 24 are of dished form, the dished member 24 being carried by the piston 2 (the front end portion of the latter) and having its base gripped between the end of the coil spring 21 and the circlip 20, while the dished member 22 is carried by the fixed tube 3 (the front end portion of the latter), being gripped between the other end of the spring 21 and a restraining circlip 23 which is engaged in a groove provided for this purpose in the tube 3.

The actuating element 47 is thus in constant engagement against the clip 26.

A respective supply orifice 93, 9 is associated with each chamber 50, 60.

More precisely, the first chamber is fed through a connector 10 and a tube 11. The connector 10 is screwed into the threaded orifice 93 of the chamber 50 (FIG. 2).

The second chamber 60 is again fed from a tube, 8, which is open into a hole 9 formed inexpensively in the flange 36, which avoids both modification of the member 1 and any increase in size.

The tubes 8 and 11 are connected to a common feed connector 12 which is fixed to a cover 13 that closes off a narrow aperture 83 formed in the hood piece 81.

An access door (not shown) is of course provided in a known manner, in order to give access to the clip 26, for the purposes of opening and closing the latter.

The hole 9 is L-shaped, with the tube 8 being force-fitted in its vertical portion, while its axial portion is blind.

Figure 3:
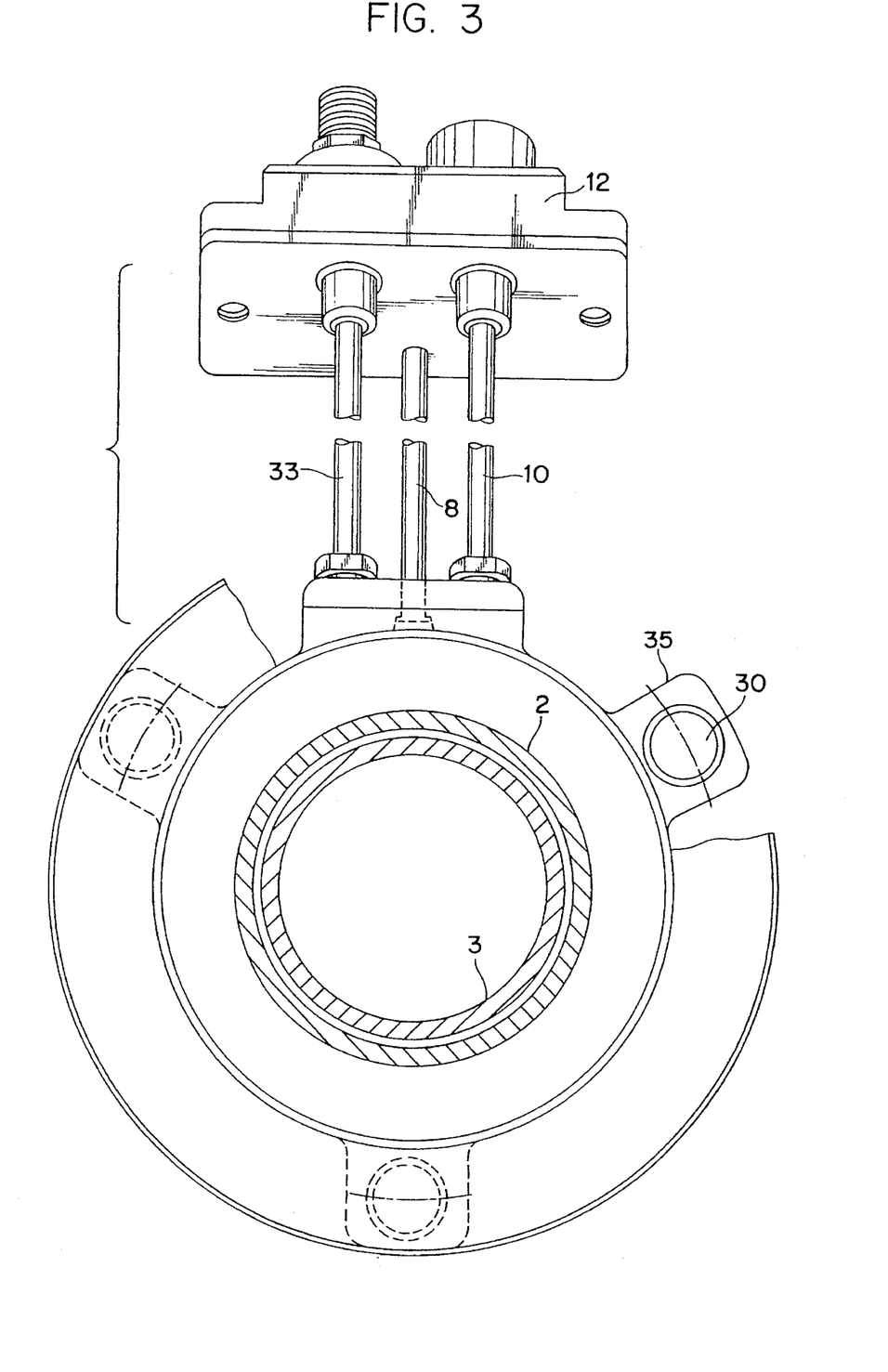
FIG. 3 is a view in cross section taken on the line 3—3 in FIG. 2.

An orifice is provided for purging the chamber 50 (FIG. 3), this being connected to a purge tube 33 which communicates into the connector 12 (FIGS. 3 and 4).

The connector 12 is secured by means of screws 34 to the cover 13, which is itself secured by means of screws 34 to the hood piece 81.

Accordingly, in order to proceed with the snapfitting assembly, the chamber 60 is put under pneumatic pressure, using for example a compressed air gun to feed the tube 8. The release bearing 15 then moves forward against the load exerted by the springs 28 and 21, until it comes into hooking engagement on the connecting piece 25.

It will be noted that all this takes place rapidly and blindly, on the production line.

In this connection, it is only after the blocks 70 and 80 have been brought together and secured together that compressed air is injected into the chamber 60, which causes the piston 2, with the release bearing 15, to move forward (towards the left in FIG. 2), and so enables automatic assembly to take place by snapfitting to the connecting piece 25. After the air gun has been withdrawn, the air escapes, and the tube 8 is closed by means of a stopper 54 (FIG. 2), having a central passage for depressurizing the second chamber 60.

For the purpose of subsequently disassembling the declutching mechanism from the piece 25, it is merely necessary, using the access door in the hood piece 81, to open the clip 26 by unhooking its fingers (FIG. 6).

Preferably, after the clip 26 has been opened, the first chamber 50 is depressurized and the second chamber 60 is pressurized, for example by means of the above mentioned air gun, so as to cause the release bearing 15 to move forward against the return spring 21, and to release the clip 26, which facilitates the disassembly process.

In a modification, the chamber 60 may be put under pneumatic pressure in advance, and it is during the movement of the two blocks 70 and 80 together that the clipping operation is carried out.

In that case, it is necessary to provide a stop valve which enables the chamber 60 to be depressurized after assembly.

It will be appreciated that in all cases, in order to proceed with the fitting of the declutching mechanism to its connecting piece 25, or its removal from it, the air or other gas which is contained in the chamber 60 is evacuated very easily and quickly, and that the chamber 50 is not pressurized, or at least the fluid contained in the latter is easily evacuated by an operation in the region of the connector 12 to open the feed to the chamber.

After the fitting operation has been carried out, the chamber 60 being depressurized, it is sufficient to supply the chamber 50 under pressure from the tube 11, in order to displace the piston 2 and the release bearing 15 towards the right in FIG. 2, and to apply traction, by virtue of the clip 26 and the actuating element, to the fingers of the diaphragm 41 so as to cause the latter to deflect.

A rolling bearing 31 is of course interposed between the flange 36 and the shaft 32, for guiding the latter in rotation.

Similarly, a sealing ring 51 is carried by the piston 2 in the vicinity of its axial end portion 52 which is mounted in the cavity delimited by the members 1, 3.

In this embodiment, the chambers 50, 60 are arranged axially one behind the other as in FIG. 8, in which those elements which are identical to those in FIGS. 1 to 4 carry the same reference numerals increased by 100. The control chamber 600 is here defined by the fixed member 100, the movable piston 200, and the thrust and guide members 122, 124 for the preloading spring 121.

In these Figures, the member 122 acts as an abutment form of a sleeve having at one of its ends a dished member for abutment and guidance of the appropriate end of the spring 121.

The other end of this spring 121 bears on the member transverse outer portion located axially on the piston 200 by means of a circlip 155 which is fitted in a groove of the piston 200, a middle portion in the form of a dished element for engagement of the spring 121, and an inner portion defining a radial flange. The sleeve 122 passes through the member 124, with sealing being provided between these two components, a sealing ring 156, preferably of a double acting kind, being provided for that purpose between the two members 122, 124, the ring working between the inner portion of the member 124, in which it is located through its radial flange, and the outer periphery of the sleeve 122.

A member 157 is secured to the member 100, for example by seaming, and this member has a sinuous shape having at its inner periphery a sleeve portion joined to a transverse plate portion which is pierced locally so as to accommodate lugs, and so as to be secured by hooking action of the sleeve 122, with the said lugs being upset (at 191).

The supply orifice 90 for the chamber 600 is formed in the vicinity of the fixed member 100, and more particularly in the fastening ears of this component.

As will have been understood, this fixed member 100 replaces the components 1 and 3, and is fixed directly on to the gearbox 82. It defines a cylinder which is concentric with the piston 200.

At its free axial end, the member 100 has a radial flange which is directed towards the axis of the assembly and which serves for guiding the piston 200, one of the axial ends of which defines a flange for engagement with the outer ring of the rolling bearing 150, with its other axial end defining a flange directed away from the axis of the assembly so as to close off the first control chamber 500, which is delimited directly by the components 100, 200 and the said flanges.

Sealing rings are of course provided, these being shown in grey in these Figures.

By delivery of compressed air through the orifice 90, the chamber 600 is pressurized so that the release bearing 150 is displaced through the distance L, and projects with respect to the member 100 defining a 10 cylinder.

Figure 9:
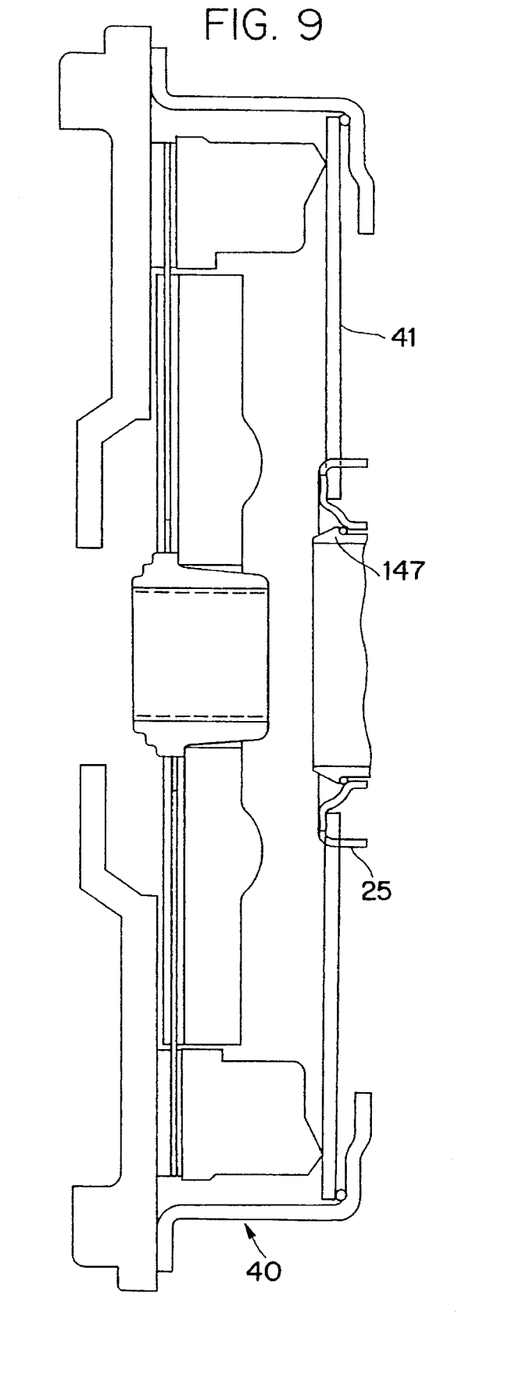
FIGS. 9 and 10 are diagrammatic views showing the position of the clutch release bearing, after it has been snap-fitted to its connecting piece and during its snap-fitting to the said connecting piece, respectively.
Figure 10:
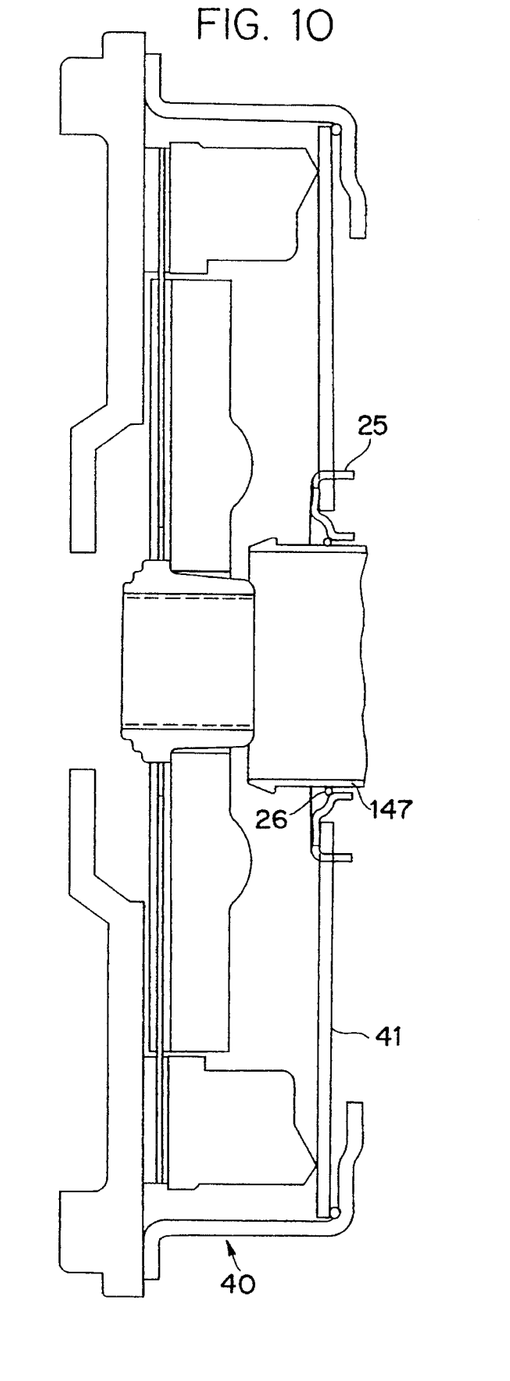

Thus the actuating element 147 (FIG. 10) penetrates into the interior of the connecting piece, and when the chamber 600 is pressurized, the clip 26 becomes gripped between the actuating element 147 and the connecting piece 25 (FIG. 9).

In all cases, the second control chamber 60, 600 is arranged in the interior of the fixed member, and the two chambers 50, 500 - 60, 600 are delimited by the movable member 2, 200, being offset axially from each 20 other.

During the snap-fitting operation, the volume of the first chamber is at a minimum.

Thus in FIG. 8, the first chamber is not filled.

The present invention is of course not limited to the embodiment described. In particular, the supply orifice for the second chamber may be located in another position.

In FIG. 8, the structures may be reversed, with the piston 200 then surrounding the cylinder 100. In that case, the purge connector 192 and the threaded feed orifice 193 for the first control chamber 500, carried by the cylinder 100, are located at the rear of the cylinder 100.

It is possible to use any type of conduit (flexible tube, rigid tube or otherwise) for connecting the control chambers 50, 500 - 60, 600 to the common feed connector 12.

Finally, and preferably, the sealing rings which are provided for the first and second control chambers are of the double acting type in order to prevent the air from penetrating into the first control chamber, and the pressure prevailing in the second control chamber is so chosen as to overcome the action of the preloading springs.

I claim:

1. A declutching mechanism in combination with a connecting piece of a clutch of a motor vehicle defining an assembly having a central axis, said mechanism comprising;

a hydraulic actuator including at least one fixed member and a moveable member in piston and cylinder relationship so as to define a first control chamber; and a clutch release bearing attached to said moveable member and manoeuverable by said moveable member in a first axial direction defining a declutching direction, for transmitting a tractive declutching force to said connecting piece;

wherein said hydraulic actuator includes a second control chamber, which is independant of said first control chamber and deliminated at least partly by said fixed member and said moveable member for manoeuvering said moveable member and said clutch release bearing axially in a direction opposite to said declutching direction.

2. A mechanism according to claim 1, wherein said control chamber is pressurised pneumatically for the purposes of fitting the declutching mechanism on said connecting piece.

3. A mechanism according to claim 2, wherein said second control chamber is connected through a conduit to a common feed connector, which is also arranged to feed said first control chamber via another conduit.

4. A mechanism according to claim 3, wherein said common connector is fixed on a hood piece through a cover.

5. A mechanism according to claim 2, wherein said second control chamber is pressurized prior to fitting said mechanism on said connecting piece, said second control chamber being closed by a stop valve for the purposes of fitting said declutching mechanism on said connecting piece.

6. A mechanism according to claim 1, in which the fixed member has a zone for its fastening to a second fixed member, wherein said second control chamber has an orifice located even with a fastening zone of said fixed part.

7. A mechanism according to claim 1, in which said movable member is mounted within a cavity which is defined by said fixed member and a guide tube for securing said fixed member, wherein said movable member has within said cavity an end portion having a first transverse flange directed away from said central axis of said assembly, said first transverse flange delimiting said second control chamber (60).

8. A mechanism according to claim 7, wherein said second control chamber, delimited by said fixed member and said guide tube, is closed by said first transverse flange of said movable member and by a second transverse flange which is part of said tube guide and which is directed away from said axis of said assembly.

9. A mechanism according to claim 8, wherein said second transverse flange has an L-shaped hole for feeding said second control chamber.

10. A mechanism according to claim 8, wherein said second transverse flange is shouldered for centering said fixed member, which has securing ears through which there pass fastening members, which also pass through said second transverse flange so as to secure said fixed member and said guide tube to a second fixed member (82).

11. A mechanism according to claim 1, wherein said second control chamber is defined in a sleeve with which said declutching mechanism is provided for abutment with a return spring.

12. A mechanism according to claim 11, wherein said second control chamber is defined by said abutment sleeve, said fixed member, a piston which is movable with respect to said fixed member, and a second abutment member.

13. A mechanism according to claim 12, wherein said second abutment member has a sinuous shape, with a transverse outer portion located axially on said piston, a dish-shaped middle portion for engagement with the said spring, and an inner portion for mounting a ring sealing it with said abutment sleeve.

14. A mechanism according to claim 13, wherein said abutment sleeve is secured in hooked relationship to a member fixed to said fixed member.

15. A mechanism according to claim 1, wherein said first and second control chambers are offset axially with respect to each other, and being seperated by said movable member.

* * * * *